(12) United States Patent
Mikhael et al.

(10) Patent No.: US 7,724,960 B1
(45) Date of Patent: May 25, 2010

(54) RECOGNITION AND CLASSIFICATION BASED ON PRINCIPAL COMPONENT ANALYSIS IN THE TRANSFORM DOMAIN

(75) Inventors: Wasfy B. Mikhael, Winter Springs, FL (US); Moataz M. Abdelwahab, Alexandria (EG)

(73) Assignee: University of Central Florida Research Foundation Inc., Orlando, FL (US)

( * ) Notice: Subject to any disclaimer, the term of this patent is extended or adjusted under 35 U.S.C. 154(b) by 929 days.

(21) Appl. No.: 11/518,354

(22) Filed: Sep. 8, 2006

(51) Int. Cl.
*G06K 9/46* (2006.01)
*G06K 9/00* (2006.01)

(52) U.S. Cl. ..................... 382/190; 382/116
(58) Field of Classification Search .............. 382/190
See application file for complete search history.

(56) References Cited

U.S. PATENT DOCUMENTS

| | | | |
|---|---|---|---|
| 5,841,470 A * | 11/1998 | Welsh | 375/240.1 |
| 6,430,307 B1 | 8/2002 | Souma et al. | 382/118 |
| 6,463,163 B1 | 10/2002 | Kresch | 382/103 |
| 6,990,217 B1 | 1/2006 | Moghaddam et al. | 381/118 |
| 7,082,394 B2 * | 7/2006 | Burges et al. | 704/243 |
| 2003/0095140 A1 * | 5/2003 | Keaton et al. | 345/700 |
| 2003/0113002 A1 * | 6/2003 | Philomin et al. | 382/116 |
| 2003/0165260 A1 * | 9/2003 | Kim et al. | 382/118 |
| 2003/0169908 A1 * | 9/2003 | Kim et al. | 382/118 |
| 2003/0212552 A1 * | 11/2003 | Liang et al. | 704/231 |
| 2003/0212557 A1 * | 11/2003 | Nefian | 704/256 |
| 2003/0215115 A1 | 11/2003 | Kim et al. | 382/118 |
| 2003/0235341 A1 * | 12/2003 | Gokturk et al. | 382/243 |
| 2004/0122675 A1 * | 6/2004 | Nefian et al. | 704/276 |
| 2004/0213454 A1 | 10/2004 | Lai et al. | 382/159 |
| 2005/0013507 A1 | 1/2005 | Lee et al. | 382/284 |
| 2005/0022252 A1 * | 1/2005 | Shen | 725/135 |
| 2005/0091275 A1 * | 4/2005 | Burges et al. | 707/104.1 |
| 2005/0105779 A1 | 5/2005 | Kamei | 382/118 |
| 2005/0123202 A1 | 6/2005 | Hwang et al. | 382/224 |
| 2005/0201595 A1 | 9/2005 | Kamei | 382/118 |
| 2006/0008150 A1 | 1/2006 | Zhao et al. | 382/190 |
| 2006/0018521 A1 | 1/2006 | Avidan | 382/118 |
| 2006/0034517 A1 | 2/2006 | Bober et al. | 382/190 |

OTHER PUBLICATIONS

Eigenfaces for Recognition, Journal of Cognitive Neuroscience, vol. 3, No. 1, Turk et al., pp. 71-86.*
Application of the Karhunen-Loeve Procedure for the Characterization of Human Faces, IEEE Transaction on Pattern Analysis and Machine Intelligence, vol. 12, No. 1, Jan. 1990, Kirby et al., pp. 103-108.*

(Continued)

*Primary Examiner*—Bhavesh M Mehta
*Assistant Examiner*—David P Rashid
(74) *Attorney, Agent, or Firm*—Brian S. Steinberger; Phyllis K. Wood; Law Offices of Brian S. Steinberger, P.A.

(57) ABSTRACT

Methods, system apparatus and devices for classification and recognition that is based on principal component analysis and is implemented in the transform domain using the fast two-dimensional PCA to processes the signal in the transform domain. The signal is represented with a reduced number of coefficients, therefore reducing the storage requirements and computational complexity while yielding high recognition accuracy.

14 Claims, 8 Drawing Sheets

OTHER PUBLICATIONS

Comparing Robustness of Two-Dimensional PCA and Eigenfaces for Face Recognition, Springer-Verlag Berlin Heidelberg, pp. 717-724, Visani et al., 2004.*

Two-Dimensional PCA: A New Approach to Appearance-Based Face Representation and Recognition, IEEE Trans. On Pattern Analysis and Machine Intelligence, vol. 26, No. 1, Jan. 2004, Yang et al., pp. 131-137.*

PCA and LDA in DCT domain, Pattern Recognition Letters 26, pp. 2474-2482, Chen et al., available online Jul. 18, 2005.*

Eigenfaces for Recognition, Journal of Cognitive Neuroscience, vol. 3, No. 1, Turk et al. pp. 71-86, Winter 1991.*

M. Turk and A. Pentland, "Face Recognition Using Eigenfaces", Proc. IEEE Conf. on Computer Vision and Pattern Recognition, (1991), pp. 586-591, in 1991.

Mikhael, Wasfy B., Abdelwahab Moataz M., "A Recognition and Classification Algorithm with Improved Accuracy, Storage, and Computational Properties with Application to Face Recognition", School of Ele. Eng. And Comp. Sci., Col. Of Eng. And Comp. Sci., University of Central Florida, 2005, 7 pages.

Abdelwahab, Moataz M., Mikhael, Wasfy B., "An Efficient Frequency Domain Algorithm For Face Recognition Based On Two-Dimensional Principal Component Analysis", $4^{th}$ WSEAS Intl. Conf. on Ele., Control and Signal Processing, Miami, Florida, Nov. 17-19, 2005 pp. 240-244.

* cited by examiner

RECOGNITION AND CLASSIFICATION BASED ON PRINCIPAL COMPONENT ANALYSIS IN THE TRANSFORM DOMAIN

FIELD OF THE INVENTION

This invention relates to facial recognition and, in particular, to methods, systems, apparatus and devices for a fast Frequency Domain Two-Dimensional Principal Component Analysis steps for facial recognition.

BACKGROUND AND PRIOR ART

Within the last several years, numerous algorithms have been proposed for face recognition. As described in M. Turk and A. Pentland, "Eigenfaces for Recognition", J. Cognitive Neuroscience, Vol. 3, No. 1, 1991, pp. 71-86 and in M. Turk and A. Pentland, "Face Recognition Using Eigenfaces", Proc. IEEE Conf. on Computer Vision and Pattern Recognition, (1991), pp. 586-591. In 1991 Turk and Pentland developed the Eigenfaces method based on the principal component analysis (PCA) or Karhunen-loeve expansion which is described in L. Sirovich and M. Kirby, "Low-Dimensional Procedure for Characterization of Human Faces", J. Optical Soc. Am., Vol. 4, 1987, pp. 519-524 and in M. Kirby and L. Sirovich, "Application of the KL Procedure for the Characterization of Human Faces", IEEE Trans. Pattern Analysis and Machine Intelligence, Vol. 12, No. 1, January 1990, pp. 103-108. The main idea of PCA is to find the vectors that best account for the distribution of face images within the entire image space.

The Eigenfaces technique yielded good performance in face recognition despite variations in the pose, illumination and face expressions. Recently in Yang J., Zhang, D., Frangi, A. F. "Two-Dimensional PCA: A New Approach to Appearance-Based Face Representation and Recognition", IEEE Transaction on Pattern Analysis and Machine Intelligence, Vol. 26, No(1), January 2004, pp. 131-137, Yang et al. proposed the two dimensional PCA (2DPCA), which has many advantages over PCA (Eigenfaces) method. It is simpler for image feature extraction, better in recognition rate and more efficient in computation. However it is not as efficient as PCA in terms of storage requirements, as it requires more coefficients for image representation.

Component Analysis Statistical projection methods, such as the eigenfaces method described by Turk and Pentland have been used widely. They have given good results for various face recognition databases. Recently Yang presented the 2DPCA method that forms the covariance matrix S from N training images Ai (where I=1 to N). Ai has m rows and n columns. The processing is performed in 2D rather than converting each image into a one dimensional vector of size m×n as in disclosed by Turk and Pentland.

The n×n S matrix is computed from $$S := \frac{1}{N} \cdot \sum_{i=1}^{N} \left[(A_i - \overline{A})^T \cdot (A_i - \overline{A})\right] \quad (1)$$

where $\overline{A}$ is the mean matrix of all the N training images.

A set of k vectors V=[V1, V2 . . . Vk] of size n is obtained, so that the projection of the training images on V gives the best scatter. It was shown by Yang et al. that the vectors Vj (where j=1 to k) are the k largest eigenvectors of the covariance matrix S, corresponding to the largest eigenvalues. V is used for feature extraction for every training image Ai.

The projected feature vectors $Y_1, Y_2, \ldots Y_k$, where $$Y_{j,i} = A_i V_j, j=1, 2, \ldots k, i=1, \ldots N \quad (2)$$

are used to form a feature matrix Bi of size m×k for each training image Ai. Where $$B_i = [Y_{1,i}, Y_{2,i}, \ldots Y_{k,i}] \ i=1, 2, \ldots N \quad (3)$$

The tested image is projected on V, and the obtained feature matrix $B_t$ is compared with those of the training images.

The Euclidean distances between the feature matrix of the tested image and the feature matrices of the training images are computed. The minimum distance indicates the image to be recognized.

$$d(B_t B_i) = \sum_{j=1}^{k} \|Y_{j,t} - Y_{j,i}\|_2 \quad (4)$$

Where $\|Y_{j,t} - Y_{j,i}\|$ denotes the distance between the two principle component vectors $Y_{j,t}$ and $Y_{j,i}$.

SUMMARY OF THE INVENTION

A primary objective of the invention is to provide new methods, systems, apparatus and devices for detection, classification and identification of one and multidimensional signals that is based on principal component analysis and is implemented in the transform domain.

A secondary objective of the invention is to provide new methods, systems, apparatus and devices for face recognition that reduces storage and computational requirements while retaining the excellent recognition accuracy of the spatial domain 2DPCA.

A third objective of the invention is to provide new methods, systems, apparatus and devices for a transform domain algorithm for face recognition that is applicable to one-dimensional and multi-dimensional applications.

A first preferred embodiment of the invention provides a method for recognizing images by first extracting plural features of a set of training images from a database, then receiving an unknown image and identifying the unknown image using the plural extracted features. The identification is accomplished in a transform domain using two-dimensional principal analysis.

The extraction step is accomplished by computing a covariance matrix S for the set of N training images, applying a discrete cosine transform to the covariance matrix to obtain T according to T=Tr{S}, determining a covariance submatrix S' of significant coefficients to replace the covariance matrix S, obtaining a set of k' eigenvalues for S', applying a discrete cosine transform to each image of the set of training images to obtain submatrix $T_i'=Tr\{A_i'\}$, then selecting a submatrix $A_i'$ containing most of the energy from the submatrix $T_i'$ to represent the set of training images and calculating a feature matrix $B_i'$ of the set of training images.

The identification step starts with applying a discrete cosine transform to the unknown image At to obtain a training matrix $T_t'$, obtaining a submatrix At' (l'×n') from the training matrix $T_t'$ containing most of the energy, calculating a feature matrix $B_t'$ for the unknown image and then computing an Euclidean distance between the feature matrix $B_t'$ of the unknown image and a feature matrix $B_i'$ of the set of testing images, wherein a minimum distance is used to identify the unknown image.

For the second embodiment, the novel a recognition system including a processor for processing a set of instructions, a training set of instructions for extracting plural features of a set of training images from a data base and a testing set of instructions for classification and identification of an unknown image according the plural extracted features, wherein recognition of the unknown image is accomplished in a transform domain using two-dimensional principal analysis.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The method, system, apparatus and device of the present invention provides steps that represent the images and their covariance matrix in the transform domain. Typically, the energy in facial images is concentrated in the low spatial frequency range. Representation of the images and their covariance matrix in the transform domain result in considerable reduction in the coefficients required to represent the images. Consequently the computational and storage requirements are greatly simplified. The transform domain two-dimensional principal component analysis begins with a training mode.

Figure 1:
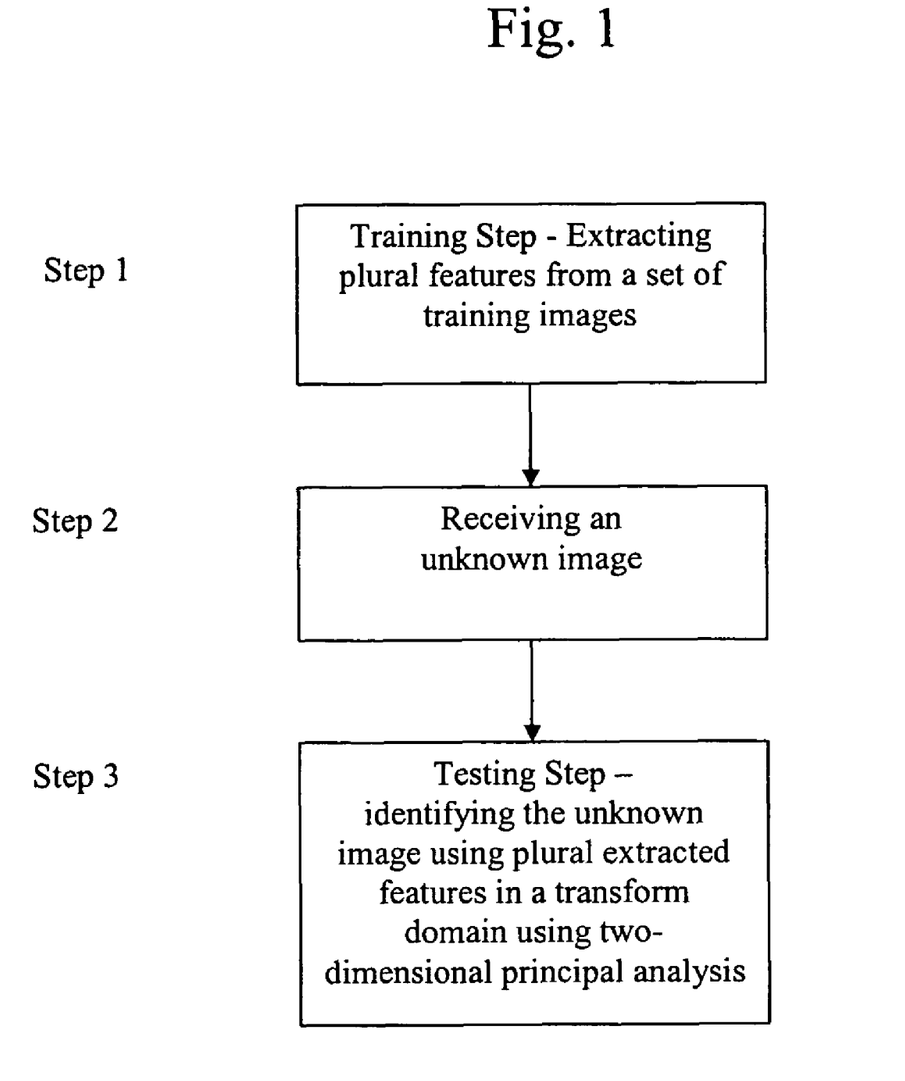
FIG. 1 is a flow diagram showing the steps for identifying an image.

FIG. 1 is a flow diagram showing the steps for recognizing images. The first step is a training step where plural features are extracted from a set of training images from a database. In the second step, an unknown image is received and in the third step, the testing step, the unknown image is identified using the plural extracted features according to the present invention wherein the identification is accomplished in a transform domain using two-dimensional principal analysis.

Figure 2:
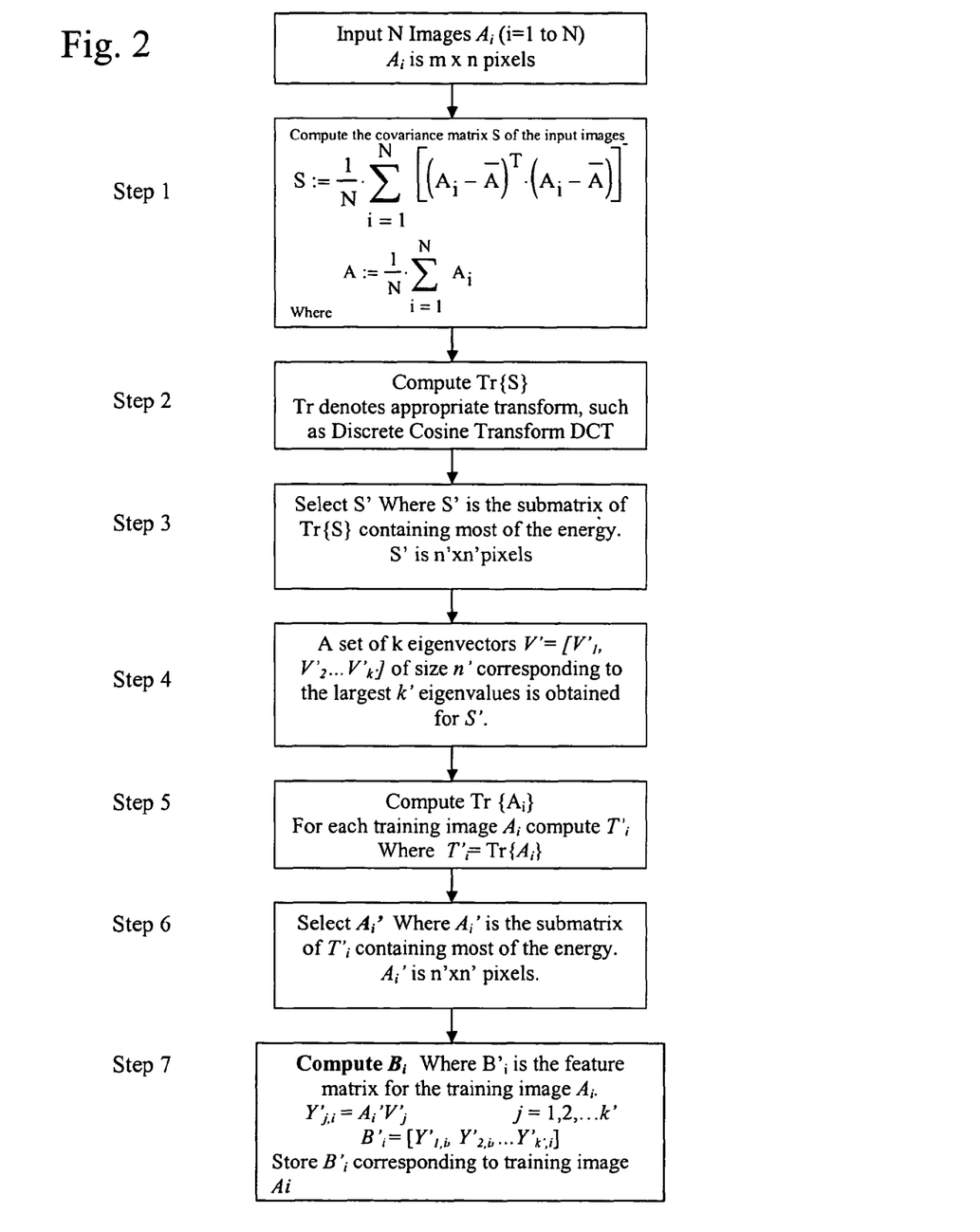
FIG. 2 is a flow diagram showing the steps for the training mode according to the present invention.

In the training mode the features of the data base are extracted and stored as described by steps 1 through 7 as shown in FIG. 2. In step 1, the n×n covariance matrix S is computed for the N training images using $$S := \frac{1}{N} \cdot \sum_{i=1}^{N} \left[ (A_i - \overline{A})^T \cdot (A_i - \overline{A}) \right]^- \quad (1)$$

where A is the mean matrix of all the N training images. In step 2, the Two-dimensional discrete cosine transform (DCT2) is applied to S to obtain T according to $$T = \text{Tr}\{S\} \quad (5)$$

Figure 8:
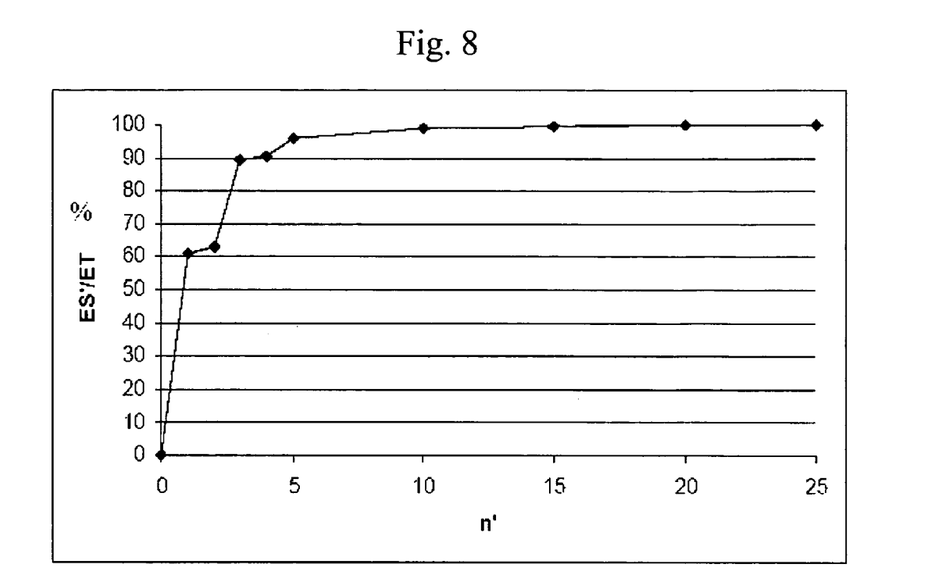
FIG. 8 is a graph showing the ratio of energy in the transform domain two-dimensional PCA (FD2DPCA) covariance matrix S'(Es') to the energy in the covariance matrix of two-dimensional DPCA ($E_T$) as a function of the number of rows and columns of S'(n').

The significant coefficients of T are contained in a submatrix, S', (upper left part of T) of dimension n'×n'. FIG. 8 shows the ratio of energy in S' to the energy in T, as a function of n'. In step 3, S' is used to replace S in our algorithm. In step 4, a set of k' eigenvectors $V'=[V_1', V_2' \ldots V_{k'}'']$ of size n' corresponding to the largest k' eigenvalues is obtained for S'. Since the dimensions of S' is much smaller than S, k' is smaller than k. In step 5, the Two-dimensional DCT is applied to each image $A_i$ of the N training images, yielding $T_i'$ (i=1 to N).

$$T_i' = \text{Tr}\{A_i\} \quad (6)$$

Figure 9:
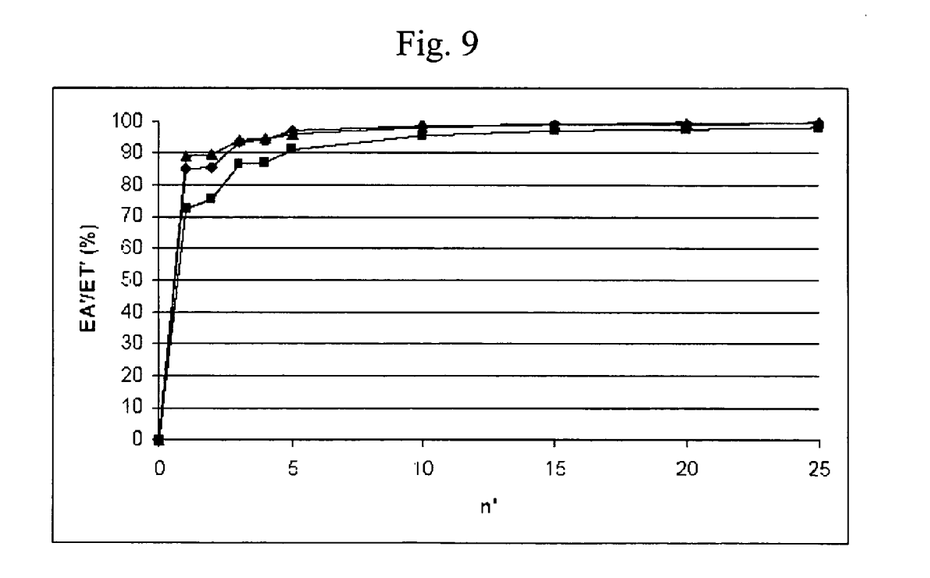
FIG. 9 is a graph showing the ratio of energy in $A_i'$(EA') to the energy $T_i'$(ET), as a function of n' for three image samples.

In step 6 the submatrix $A_i'$ from $T_i'$, containing most of the energy is retained (upper left part of $T_i'$). FIG. 9 is a graph showing the ratio of energy in $A_i'$(EA') to the energy $T_i'$ (ET), as a function of n' for three images. This submatrix is used to represent the training image. Dimensions of $A_i'$ is l'×n' where l'≦n'. The feature matrices of the training images $B_i'$ are calculated in step 7 in a manner similar to equations (2) and (3). Thus $$Y_{j,i}' = A_i' V_j' \; j=1, 2, \ldots k' \text{ and } i=1, 2, \ldots N \quad (7)$$

$$B_i' = [Y_{1,i}', Y_{2,i}', \ldots Y_{k',i}'] \quad (8)$$

Now the feature matrix representing the training image has dimensions (l'×k') where l'≦n', n' is much smaller than n and m, and k'<k.

Figure 3:
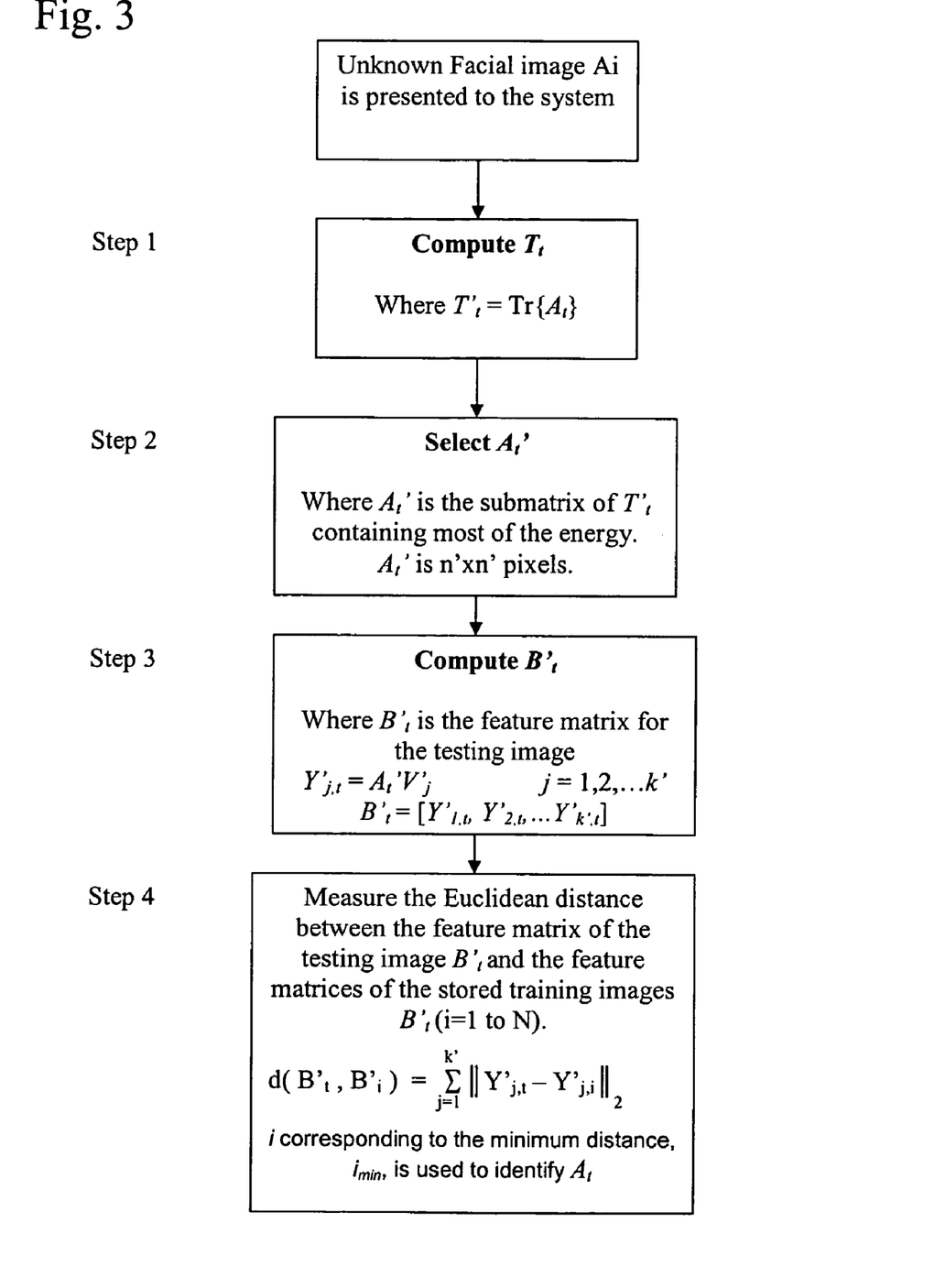
FIG. 3 is a flow diagram showing the steps for the testing mode according to the present invention.

In the testing mode, a facial image At is introduced to the system for identification as shown in FIG. 3. In training step 1, the Two-Dimensional DCT is applied to $A_t$ which yields $T_t'$.

$$T_t' = \text{Tr}\{A_t\} \quad (9)$$

The sub matrix $A_t'$(l'×n') containing most of the energy is obtained from $T_t'$ in step 2 and in step 3, the feature matrix $B_t'$ for the testing image is calculated from $$Y_{j,t}' = A_t' V_j' \; j=1, 2, \ldots k' \quad (10)$$

$$B_t' = [Y_{1,t}', Y_{2,t}', \ldots Y_{k',t}'] \quad (11)$$

In step 4, the Euclidean distance between the feature matrix of the testing image $B_t'$ and the feature matrices of the training images $B_i'$ (i=1 to N) are computed using equation (4). Corresponding to the minimum distance, imin, i is used to identify t.

Figure 4:
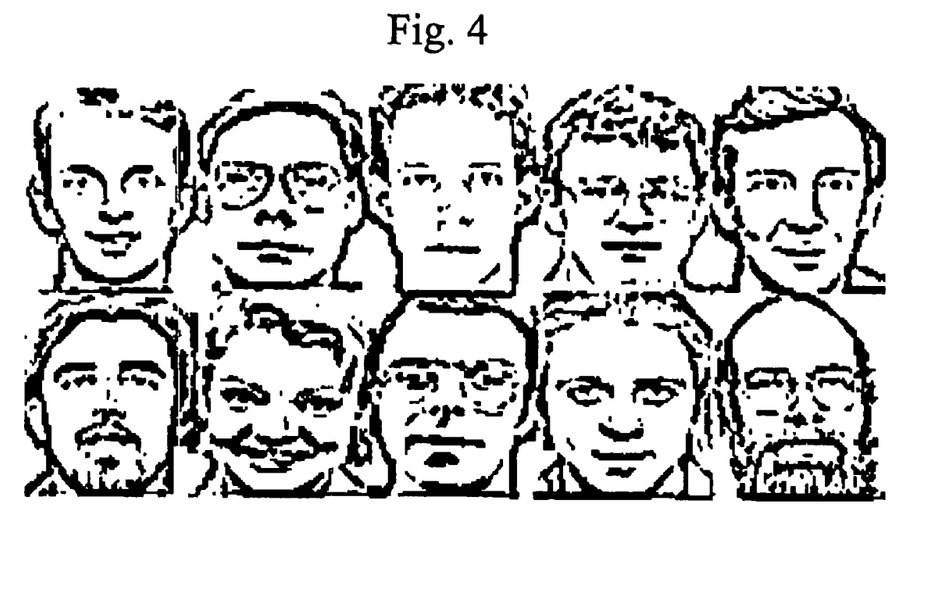
FIG. 4 shows ten sample images for three distinct individuals in the ORL data base.
Figure 5:
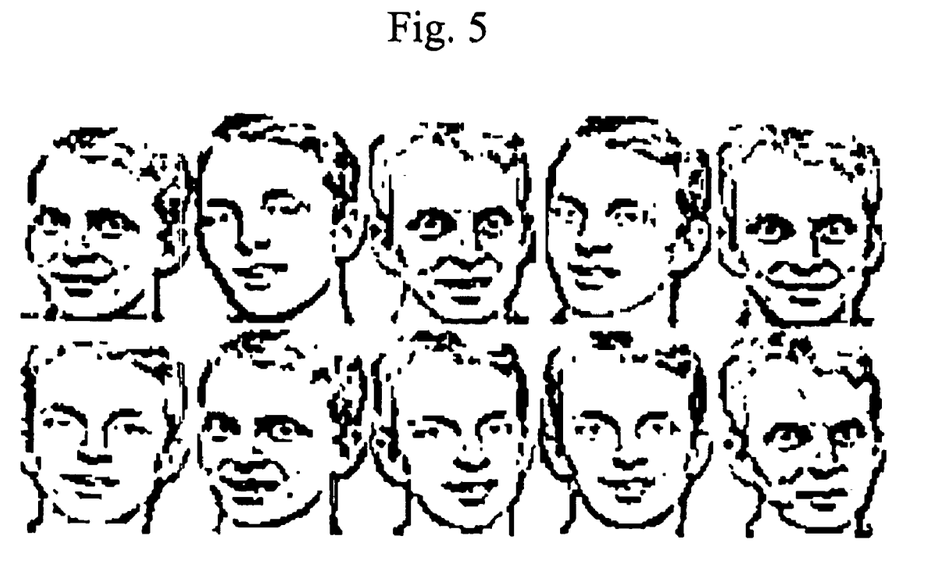
FIG. 5 shows ten sample images for one distinct individual in the ORL database.
Figure 6:
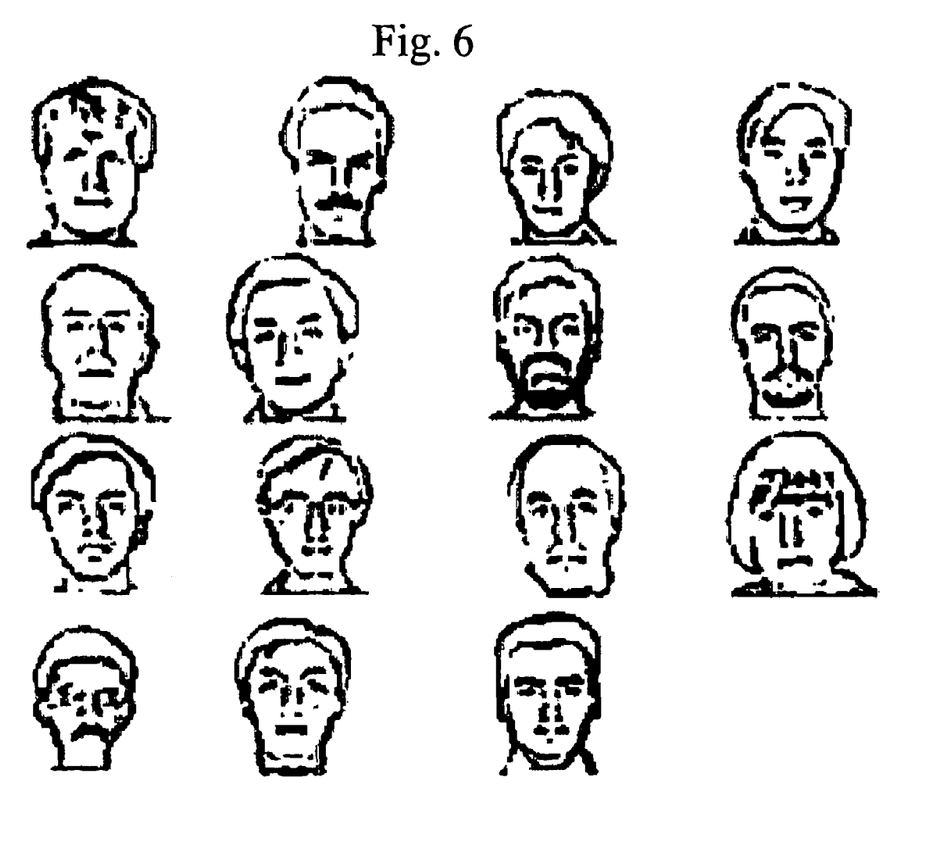
FIG. 6 shows ten sample images for fifteen distinct individuals in the Yale database.
Figure 7:
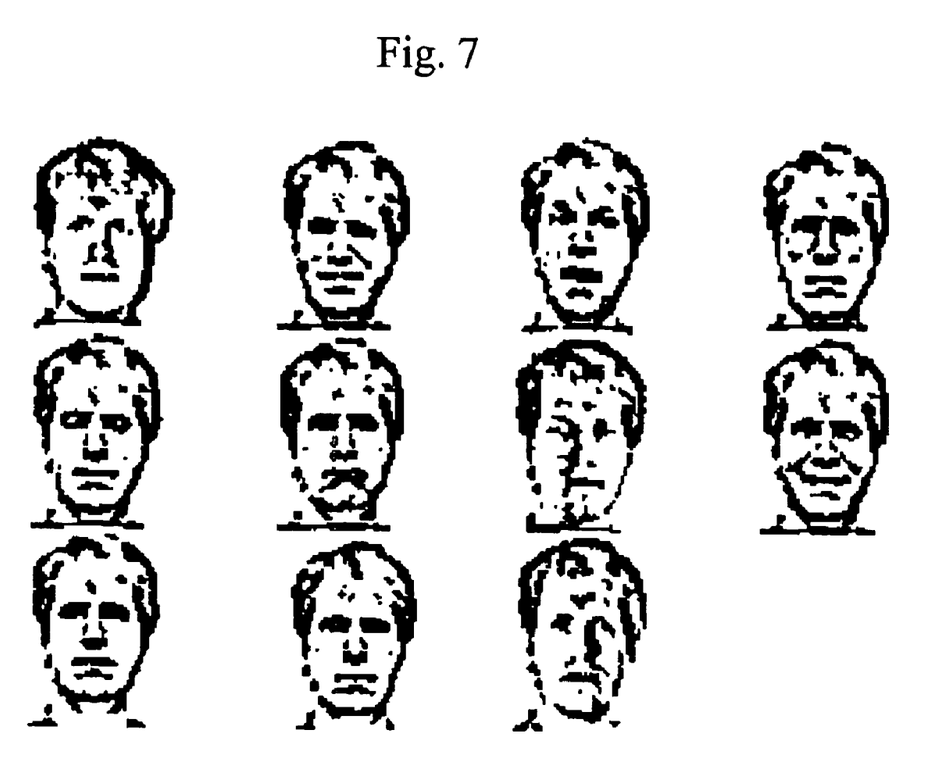
FIG. 7 shows eleven sample images for one distinct individual in the Yale database.
Figure 10:
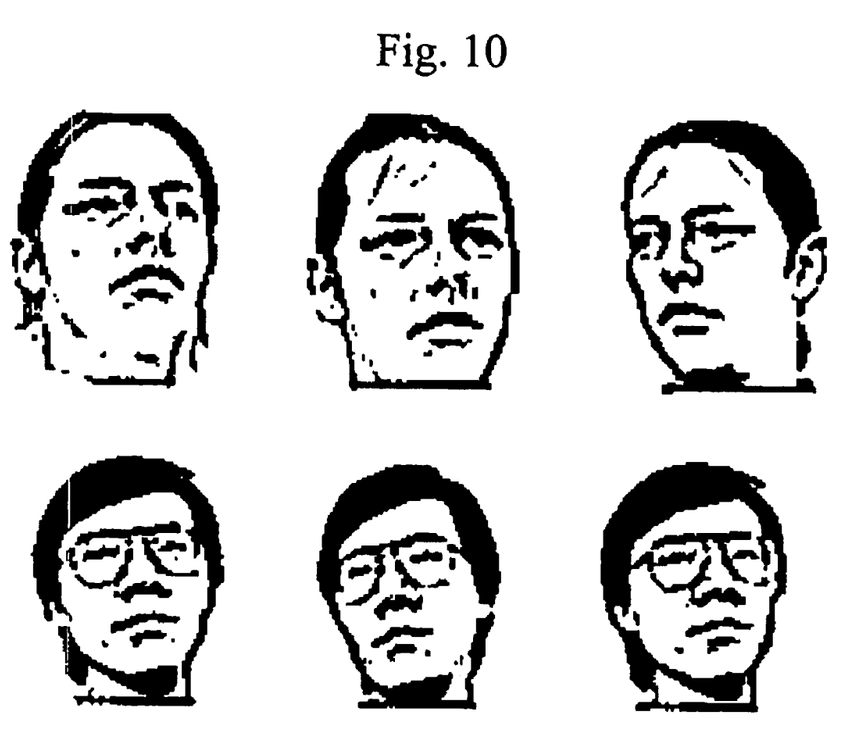
FIG. 10 shows three image samples for two distinct individuals in the UMIST database

The apparatus, methods, systems and devices of the present invention were applied to the ORL database, the Yale database and a subset of the UMIST database using two dimensional discrete cosine transform. The ORL database consists of 400 images of 40 individuals, 10 images of each individual, where pose and facial expressions vary as shown in FIGS. 4 and 5, respectively. The Yale database consists of 165 images of 15 discrete individuals, 11 images each where illumination and face expression vary as shown in FIGS. 6 and 7, respectively. The subset used for the UMIST database consists of 200 images of 20 individuals where pose is varying as shown in FIG. 10.

Two experiments were applied to the ORL data base, where all the images are grayscale with 112×92 pixels each. In the first experiment, 40 images of 40 different individuals are used for training and the remaining 360 images are used for testing. The covariance matrix S for the 40 training images is 92×92. A two-dimensional DCT is applied to the covariance matrix S which yields T. S' is obtained for n'=20. The 5 largest eigenvectors of S' corresponding to the 5 largest eigenvalues are obtained, i.e, k' is chosen to be 5 (for the 2DPCA method k=10 is used for the best recognition accuracy). Ti' (i=1 to 40) are obtained. Then Ai' of dimensions 20×20 (i=1 to 40) is determined, i.e, l'×n'=20×20. The feature matrices for the training images are obtained using equations (7) and (8).

In the second experiment 5 images per class were used for training and the remaining 200 images were used for testing. The Dimensions of S' and Ai' are the same as in the first experiment. k' is chosen equal to 5. For the 2DPCA method, k equals 10 is used for the best recognition accuracy. Results using the TD/2DPCA according to the present invention, 2DPCA, and PCA techniques are listed in Table I. As shown in Table I, TD/2DPCA yields similar recognition accuracy as the 2DPCA method.

TABLE I

| Method | Method Recognition accuracy for experiment I | Recognition accuracy for experiment II |
|---|---|---|
| FD2DPCA | 73.61% | 92.0% |
| 2DPCA | 72.77% | 91.0% |
| PCA | 62.8% | 83.5% |

Table II shows the computational complexity, in terms of the number of multiplications, and the storage requirements, in terms of the dimensions of the feature matrix.

TABLE II

| | FD2DPCA | 2DPCA |
|---|---|---|
| Dimensions of feature matrix per image | (20 × 5) | (112 × 10) |
| Storage requirements for N images | (20 × 5) × N | (112 × 10) × N |
| # of multiplication for training mode | 47104 + 57344 × N | 103040 × N |
| # of multiplication for testing mode | 57344 | 103040 |

As shown in Table II, for the FD/2DPCA, the amount of storage is drastically reduced (by approximately 90%), while the computational complexity is lower, compared with one of the best available algorithm, 2DPCA. This is accomplished while maintaining the same level of recognition accuracy. It can be easily shown that the excellent properties of the new technique are maintained for the facial databases.

In the next experiment, a subset of images from the Yale database were used, the dimensions of the images used was 243×320. Five (5) images per class were used for training and the remaining images are used for testing. In the Yale experiment, the Dimensions of S' is (50×50), and the dimension of Ai' is (50×50). k' is chosen equal to 5. For the 2DPCA method, k equals 20 is used for the best recognition accuracy. Results are listed in table III which shows that the TD/2DPCA gives similar recognition accuracy as the 2DPCA with a feature matrix per image much more reduced in size (approximately 95%). Table III shows the recognition accuracy, storage requirements and computational complexity for the experiment on the Yale database.

TABLE III

| | TD/2DPCA | 2DPCA |
|---|---|---|
| Recognition Accuracy | 78.8% | 77.7% |
| Dimensions of feature matrix per image | 50 × 5 | 243 × 20 |
| Storage requirement for N images | (50 × 5) × N | (243 × 20) × N |
| Number of multiplications for training mode | ≈248832 + (262144 × N) | 1555200 × N |
| Number of multiplications for testing mode | 262144 | 1555200 |

TD/2DPCA was also applied to a subset of images from the UMIST database. In this experiment, each image is cropped and scaled to 185×160. Three images per class were used for training and the remaining images were used for testing. The Dimensions of S' is (40×40), and the dimension of Ai' is (40×40). k' was chosen to equal 5. For the 2DPCA method, k equals 15 is used for the best recognition accuracy. The results of the UMIST experiment are listed in table IV which also confirms that TD/2DPCA gives similar recognition accuracy as the 2DPCA with a reduced feature matrix per image and lower computation requirements.

TABLE IV

| | TD/2DPCA | 2DPCA |
|---|---|---|
| Recognition Accuracy | 78.8% | 77.7% |
| Dimensions of feature matrix per image | 50 × 5 | 243 × 20 |

The Two-Dimensional principal component analysis (2DPCA) method has shown higher recognition accuracy and faster speed than eigenfaces method based on one dimensional PCA. However the 2DPCA storage requirements for feature vectors are increased by a large factor, typically greater than 10. A Transform Domain 2DPCA algorithm significantly reduces these storage requirements and maintains the high recognition rate obtained using the 2DPCA. In addition, the proposed TD/2DPCA takes advantage of existing fast implementations in the frequency domain which results in appreciable reduction in the computational complexity. Experimental results confirm the attractive feature of the proposed technique.

In summary, the present invention provides methods, systems, apparatus and devices using transform domain two-dimensional PCA for classification and recognition. Advantages of using TD/2DPCA include reduced storage requirements and computational complexity while yielding high accuracy for application in as facial recognition. The application of the algorithm to the face recognition problem described was implemented using the discrete cosine transform. The facial recognition application is for example only, alternative recognition applications may be substituted. The TD/2DPCA according to the present invention was tested using a subset of images from ORL, Yale, and UMIST databases. The experimental results confirm the excellent properties of TD/2DPCA.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for a processor in a computer system executing a set of instructions to recognize images comprising the steps of:
   extracting plural features from a set of N training images stored in a database on the computer system comprising the steps of:
   computing a covariance matrix S for the set of N training images;
   applying a discrete cosine transform to the covariance matrix S to obtain T according to $T=Tr\{S\}$;
   determining a covariance submatrix S' of significant coefficients to replace the covariance matrix S;
   obtaining a set of k' eigen values for S';
   applying a discrete cosine transform to each image of the set of N training images to obtain submatrix $T_i'=Tr\{A_i'\}$;
   selecting a submatrix $A_i'$ from the submatrix $T_i'$ to represent the set of training images N; and
   calculating a feature matrix $B_i'$ of the set of N training images;
   receiving an unknown image At; and
   identifying the unknown image At using the plural extracted features, wherein the identification is accomplished in a transform domain using two-dimensional principal analysis.

2. The method of claim 1, wherein the computing a covariance matrix S computation step comprises the step of:
   computing a covariance matrix S according to $$S := \frac{1}{N} \cdot \sum_{i=1}^{N} \left[(A_i - \overline{A})^T \cdot (A_i - \overline{A})\right].$$

3. The method of claim 1, wherein the step of determining a covariance submatrix S' of significant coefficients comprises the steps of:
   selecting a submatrix S' of covariance matrix S containing significant coefficients of T; and
   substituting S' for S.

4. The method of claim 3, further comprising the step of:
   selecting the submatrix S' having a dimension less than 10×10.

5. The method of claim 4, further comprising the step of:
   selecting the submatrix S' having a dimension of 5×5.

6. The method of claim 1, wherein the feature matrix $B_i'$ calculation step comprises the step of:
   calculating feature matrix $B_i'$ for the set of N training image using $$Y_{j,i} = A_i' V_j' \; j=1,2,\ldots k' \text{ and } i=1,2,\ldots N$$

$$B_i' = [Y_{1,i}', Y_{2,i}', \ldots Y_{k',i}'].$$

7. The method of claim 1, wherein the identification step comprises the steps of:
   applying a discrete cosine transform to the unknown image At to obtain a training matrix $T_t'$;
   obtaining a submatrix At' (l'×n') from the training matrix $T_t'$;
   calculating a feature matrix $B_t'$ for the unknown image At; and
   computing an Euclidean distance between the feature matrix $B_t'$ of the unknown image At and a feature matrix $B_i'$ of the set of N training images, wherein a predetermined minimum distance is used to identify the unknown image At.

8. The method of claim 7, wherein the feature matrix calculation step comprises the step of:
   calculating the feature matrix $B_t'$ for the unknown image At according to $$Y_{j,t}' = A_t' V_j' \; j=1,2,\ldots k'$$

$$B_t' = [Y_{1,t}', Y_{2,t}', \ldots Y_{k',t}'].$$

9. A recognition system comprising:
   a processor for processing a set of instructions;
   a training set of instructions for extracting plural features of a set of N training images from a data base, the training set of instructions comprising:
   a first subset of training instructions for computing a covariance matrix for the set of training images N;
   a second subset of training instructions for applying a discrete cosine transform to the covariance matrix according to $T=Tr\{S\}$
   a third subset of training instructions for determining a covariance submatrix S' of significant coefficients to replace the covariance matrix S;
   a fourth subset of training instructions for obtaining a set of k' eigenvalues for S';
   a fifth subset of training instructions for applying a discrete cosine transform to each image of the set of training images N to obtain submatrix $T_i'=Tr\{A_i'\}$;
   a sixth subset of training instructions for selecting a submatrix $A_i'$ from the submatrix $T_i'$ to represent the set of training images N; and
   a seventh subset of training instructions for calculating a feature matrix $B_i'$ of the set of N training images; and
   a testing set of instructions for classification and identification of an unknown image according to the plural extracted features, wherein recognition of the unknown image is accomplished in a transform domain using two-dimensional principal analysis.

10. The system of claim 9, wherein the first subset of training instructions comprises:
    a sub-subset of instructions for computing the covariance matrix according to $$S := \frac{1}{N} \cdot \sum_{i=1}^{N} \left[(A_i - \overline{A})^T \cdot (A_i - \overline{A})\right]$$

where A is the mean matrix of the set of training images N.

11. The system of claim 9, wherein the seventh subset of instructions comprises:
    a sub-subset of instructions for calculating feature matrix $B_t'$ for the set of training images N is calculated according to $$Y_{j,i}' = A_i' V_j' \; j=1,2,\ldots k' \text{ and } i=1,2,\ldots N$$

$$B_t' = [Y_{1,i}', Y_{2,i}', \ldots Y_{k',i}'].$$

12. The system of claim 9, wherein the testing set of instructions comprises:
- a first subset of testing instructions for applying a discrete cosine transform to the unknown image $A_t$ to obtain a training matrix;
- a second subset of testing instructions for obtaining a sub-matrix $A_t'$ (l'×n') from the training matrix $T_t'$;
- a third subset of testing instructions for calculating a feature matrix $B_t'$ for the unknown image; and
- a fourth subset of testing instructions for computing an Euclidean distance between the feature matrix $B_t'$ of the unknown image and a feature matrix $B_t'$ of the set of testing images, wherein a minimum distance is used to identify the unknown image.

13. The system of claim 9, wherein said unknown image is one-dimensional.

14. The system of claim 9, wherein said unknown image is multi-dimensional.

* * * * *